(12) United States Patent
Wang et al.

(10) Patent No.: US 12,457,528 B2
(45) Date of Patent: Oct. 28, 2025

(54) CELL RESELECTION METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 511 days.

(21) Appl. No.: 17/856,269

(22) Filed: Jul. 1, 2022

(65) Prior Publication Data

US 2022/0338070 A1    Oct. 20, 2022

Related U.S. Application Data

(63) Continuation of application No. PCT/CN2020/070144, filed on Jan. 2, 2020.

(51) Int. Cl.
   H04W 36/00   (2009.01)
   H04W 48/16   (2009.01)

(52) U.S. Cl.
   CPC .......... H04W 36/0007 (2018.08); H04W 36/008357 (2023.05); H04W 48/16 (2013.01)

(58) Field of Classification Search
   CPC ..... H04W 36/0007; H04W 36/008357; H04W 48/16
   See application file for complete search history.

(56) References Cited

U.S. PATENT DOCUMENTS

2012/0236776 A1*  9/2012  Zhang .............. H04L 12/18
                                                    370/312
2019/0230564 A1   7/2019  Kim et al.
                  (Continued)

FOREIGN PATENT DOCUMENTS

CN    102487480 A    6/2012
CN    102685684 A    9/2012
              (Continued)

OTHER PUBLICATIONS

Extended European Search Report dated Dec. 16, 2022 received in European Patent Application No. EP20910250.8.
(Continued)

*Primary Examiner* — Duc C Ho
(74) *Attorney, Agent, or Firm* — Sheppard, Mullin, Richter & Hampton LLP (57) ABSTRACT

Provided are a cell reselection method and apparatus, a terminal device, and a network device. The method includes: receiving, by a terminal device, first configuration information transmitted by a serving cell, the first configuration information being used to determine at least one of: MBMS service deployment information of an adjacent frequency, MBMS service deployment information of a neighboring cell, a bandwidth of an initial BWP of the neighboring cell, a sub-carrier spacing of the initial BWP of the neighboring cell, a bandwidth of an MBMS BWP of the neighboring cell, and a sub-carrier spacing of the MBMS BWP of the neighboring cell; and determining, by the terminal device based on the first configuration information device, a target cell for cell reselection.

18 Claims, 6 Drawing Sheets

(56) References Cited

U.S. PATENT DOCUMENTS

2019/0289531 A1* 9/2019 Takahashi ............. H04W 48/16
2021/0176656 A1 6/2021 Sang et al.

FOREIGN PATENT DOCUMENTS

| CN | 103098496 | A | 5/2013 | |
|----|-----------|---|--------|---|
| CN | 106550420 | A | 3/2017 | |
| CN | 107241702 | A | 10/2017 | |
| CN | 110636519 | A | 12/2019 | |
| EP | 1509056 | B1 | 11/2010 | |
| WO | WO-2013023558 | A1 * | 2/2013 | ............. H04H 20/71 |
| WO | 2017071473 | A1 | 5/2017 | |
| WO | 2019140636 | A1 | 7/2019 | |
| WO | 2019233119 | A1 | 12/2019 | |

OTHER PUBLICATIONS

International Search Report and Written Opinion dated Oct. 12, 2020 in International Application No. PCT/CN2020/070144. English translation attached.

Qualcomm Incorporated et al. "Consideration of service continuity with eMBMS support on NCT", R2-131237, 3GPP TSG RAN WG2 #81bis, Apr. 19, 2013 (Apr. 19, 2013), sections 2-3.

Ericsson. "MBMS SI-Solution on MBMS service continuity", S6-161553, 3GPP TSG-SA WG6 Meeting #14, Nov. 18, 2016 (Nov. 18, 2016), the whole document.

Communication pursuant to Article 94(3) EPC for European application 20910250.8 mailed Sep. 12, 2023.

The First Office Action from corresponding Chinese Application No. 202310509624.5 dated Aug. 27, 2024.

Huawei et al., "Addition of NR test case 6.2.3.1-Inter-RAT Cell reselection L2NR by priority Srxlev based", R5-193617, 3GPP TSG-RAN5 Meeting #83, May 15, 2019.

* cited by examiner

```
Receiving, by a terminal device, first configuration information
transmitted by a serving cell, the first configuration information
being used to determine at least one of: MBMS service deployment
information of an adjacent frequency, MBMS service deployment
information of a neighboring cell, a bandwidth of an initial BWP of
the neighboring cell, a subcarrier spacing of the initial BWP of the
neighboring cell, a bandwidth of a MBMS BWP of the neighboring
cell, and a subcarrier spacing of the MBMS BWP of the neighboring
cell
```
801

```
Determining, by the terminal device, a target cell for cell reselection
based on the first configuration information
```
802

CELL RESELECTION METHOD AND APPARATUS, TERMINAL DEVICE, AND NETWORK DEVICE

CROSS-REFERENCE TO RELATED APPLICATIONS

The present application is a continuation of International Application No. PCT/CN2020/070144 filed on Jan. 2, 2020, which is hereby incorporated by reference in its entirety.

TECHNICAL FIELD

The embodiments of the present disclosure relate to mobile communication technologies, and more particular, to a cell reselection method and apparatus, terminal device, and network device.

BACKGROUND

Multimedia Broadcast Multicast Service (MBMS) is a technology that transmits data from one data source to multiple users by sharing network resources. This technology can effectively utilize network resources while providing multimedia services, and realize the broadcast and multicast of multimedia services at higher rates (e.g., 256 kbps).

In the New Radio (NR) system, many scenarios need to support the service requirements of multicast and broadcast, such as the Internet of Vehicles, Internet of Industrial, etc., so it is necessary to introduce MBMS in NR. When a terminal device receives an MBMS service, cell reselection may occur, which may result in interruption of the reception of the MBMS service and poor user experience.

SUMMARY

Embodiments of the present disclosure provide a cell reselection method and apparatus, terminal device, and network device.

The cell reselection method provided by the embodiment of the present disclosure includes: receiving, by a terminal device, first configuration information transmitted by a serving cell, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell, and determining, by the terminal device, a target cell for cell reselection based on the first configuration information.

The cell reselection method provided by the embodiment of the present disclosure includes: transmitting, by a serving cell, first configuration information to a terminal device, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell.

The cell reselection apparatus, applied in a terminal device, is provided by the embodiment of the present disclosure. The apparatus includes a receiving unit and a determining unit. The receiving unit is configured to receive first configuration information transmitted by a serving cell, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell, and the determining unit is configured to determine a target cell for cell reselection, based on the first configuration information.

The cell reselection apparatus, applied in a terminal device, is provided by the embodiment of the present disclosure. The apparatus incudes a transmitting unit configured to transmit first configuration information to a terminal device, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell.

The terminal device provided by the embodiment of the present disclosure includes a processor, and a memory having a computer program stored thereon, the processor being configured to invoke and execute the computer program stored in the memory to implement the foregoing cell reselection method.

The network device provided by the embodiment of the present disclosure includes a processor, and a memory having a computer program stored thereon, the processor being configured to invoke and execute the computer program stored in the memory to implement the foregoing cell reselection method.

A chip provided by the embodiment of the present disclosure is configured to implement the foregoing cell reselection method.

Specifically, the chip includes a processor configured to invoke and execute a computer program from a memory, to cause a device installed with the chip to implement the foregoing cell reselection method.

The computer-readable storage medium provided by the embodiment of the present disclosure, has a computer program stored thereon, the computer program causes a computer to implement the foregoing cell reselection method.

The computer program product provided by the embodiment of the present disclosure includes computer program instructions that cause a computer to implement the foregoing cell reselection method.

The computer program provided by the embodiment of the present disclosure, when executed by a computer, cause the computer to implement the foregoing cell reselection method.

Through the foregoing technical solutions, the serving cell broadcasts the MBMS service deployment information and information related to the BWP of the adjacent frequency and/or the neighboring cell, and the terminal device can select a cell, which is supported by its own capability and where the MBMS service is deployed, as a target cell for cell reselection, so that it is achieved that NR system supports a continuous reception of the MBMS service, and the user experience is guaranteed.

BRIEF DESCRIPTION OF DRAWINGS

The figures described herein are used to provide further understanding of the present disclosure and be a part of the present disclosure. The schematic embodiments and descriptions of the present disclosure are used to explain the present disclosure and do not constitute an improper limitation of the present disclosure.

DESCRIPTION OF EMBODIMENTS

The technical solutions in the embodiments of the present disclosure will be described below in conjunction with the accompanying drawings of the embodiments of the present disclosure. Obviously, the described embodiments are some of the embodiments of the present disclosure, rather than all of the embodiments. Based on the embodiments in the present disclosure, all other embodiments obtained by those of ordinary persons skilled in the art without inventive efforts shall fall within the protection scope of the present disclosure.

The technical solutions of the embodiments of the present disclosure can be applied in various communication systems, such as: a Long Term Evolution (LTE) system, a LTE Frequency Division Duplex (FDD) system, a LTE Time Division Duplex (TDD) system, a 5G communication system or a future communication system, etc.

Figure 1:
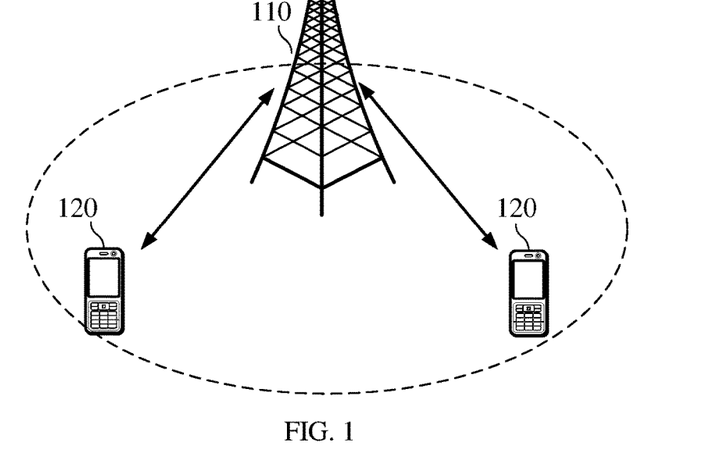
FIG. 1 is a schematic diagram of a communication system architecture according to an embodiment of the present disclosure.

Exemplarily, a communication system 100 in which an embodiment of the present disclosure is applied is illustrated in FIG. 1. The communication system 100 may include a network device 110, and the network device 110 can be a device that communicates with a terminal 120 (or a communication terminal, a terminal). The network device 110 may provide communication coverage for a particular geographic area and may communicate with terminals located within the coverage area. In at least one alternative embodiment, the network device 110 can be an Evolutional Node B (eNB or eNodeB) in an LTE system, or a radio controller in a Cloud Radio Access Network (CRAN), or the network device can be a mobile switching center, a relay station, an access point, a vehicle-mounted device, a wearable device, a hub, a switch, a bridge, a router, a network-side device in a 5G network, or a network device in a future communication system, etc.

The communication system 100 also includes at least one terminal 120 located within the coverage of the network device 110. "Terminal" as used herein includes, but is not limited to, a transmitter connected via a wired line, such as a Public Switched Telephone Network (PSTN), a Digital Subscriber Line (DSL), a digital cable, a direct cable; and/or via another data connection/network; and/or via a wireless interface, e.g., for a cellular network, a Wireless Local Area Networks (WLAN), a digital television networks such as DVB-H networks, a satellite network, an AM-FM broadcast; and/or an apparatus of another terminal configured to receive/transmit a communication signal; and/or an Internet of Things (IoT) device. A terminal configured to communicate through a wireless interface may be referred to as "a wireless communication terminal", "a wireless terminal" or "a mobile terminal". Examples of a mobile terminal include, but are not limited to, a satellite telephone or a cellular telephone; a Personal Communications System (PCS) terminal that may combine a cellular radio telephone with a data processing capability, a fax capability, and a data communication capability; may include a PDA that may include a radio telephone, a pager, an Internet/Intranet network access, a Web browser, a memo pad, a calendar, and/or a Global Positioning System (GPS) receiver; and a conventional laptop and/or palm receiver or other electronic devices including radiotelephone transceivers. A terminal may be an access terminal, a User Equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless-communication function, a computing device or other processing devices connected to a wireless modem, an in-vehicle device, a wearable device, a terminal in 5G networks or a terminal in future-evolved Public Land Mobile Network (PLMN), etc.

In at least one alternative embodiment, a communication between the terminals 120 may be a Device to Device (D2D) communication.

In at least one alternative embodiment, a 5G communication system or a 5G network may also be referred to as a New Radio (NR) system or an NR network.

FIG. 1 illustrate a network device and two terminals as an example. In at least one alternative embodiment, the communication system 100 may include a plurality of network devices and a coverage of each network device may include terminals of other numbers, which is not limited herein.

In at least one alternative embodiment, the communication system 100 may further include other network entities such as a network controller and a mobility management entity, which is not limited herein.

It should be understood that, in the embodiments of the present disclosure, a device with a communication function in the network/system may be referred to as a communication device. Taking the communication system 100 illustrated in FIG. 1 as an example, the communication device may include a network device 110 and a terminal 120 that are with a communication function, and the network device 110 and the terminal 120 may be the specific devices described above, which will not be repeated here. The communication device may also include other devices in the communication system 100, such as other network entities e.g., a network controller and a mobility management entity, which is not limited herein.

It should be understood that the terms "system" and "network" are often used interchangeably herein. The term "and/or" in this article is only an association relationship to describe the associated objects, indicating that there can be three kinds of relationships, for example, A and/or B, can mean that: A exists independently, A and B exist at the same time, and B exist independently. In addition, the character "/" in this text generally indicates that the related objects before and after the character are in an "or" relationship.

For the convenience of understanding the technical solutions of the embodiments of the present disclosure, the technical solutions related to the embodiments of the present disclosure are described below.

As people pursuing a high speed, a low delay, a high-speed mobility, a high energy efficiency, and the diversity and complexity of services being in future life, a third Generation Partnership Project (3GPP) international standards organization began to develop 5G. Main application scenarios of 5G are: an enhanced Mobile Broadband (eMBB), an Ultra-Reliable Low-Latency Communications (URLLC), and a massive Machine-Type Communications (mMTC).

On one hand, eMBB still targets users to obtain multimedia content, services and data, and its demand is growing rapidly. On the other hand, since eMBB may be deployed in different scenarios, such as indoor, urban, rural scenarios, etc., its capabilities and requirements are also quite different, so it cannot be generalized and must be analyzed in detail in combination with specific deployment scenarios. Typical applications of URLLC include: an industrial automation, a power automation, a telemedicine operation (a surgery), a traffic safety assurance, etc. Typical features of mMTC include: a high connection density, a small data size, a latency-insensitive service, a low cost and long service life of the module.

In the early deployment of NR, it is difficult to obtain complete NR coverage, so typical network coverage is a wide-area LTE coverage mode and an NR island-coverage mode. And a lot of LTE is deployed below 6 GHz, and there is very little below-6 GHz spectrum available for 5G. Therefore, NR must study the spectrum application above 6 GHz, while the high frequency band has limited coverage and fast signal fading. At the same time, in order to protect the early investment of mobile operators in LTE, a working mode of tight interworking between LTE and NR is proposed.

RRC State 5G defines a new Radio Resource Control (RRC) state, that is, an RRC_INACTIVE state, for the purpose of reducing air interface signaling and quickly restoring radio connections and data services. This state is different from an RRC_IDLE state and an RRC_ACTIVE state.

1) RRC_IDLE state (abbreviated as idle state): mobility is UE-based cell reselection, paging is initiated by a Core Network (CN), and a paging area is configured by the CN. There is no UE context and no RRC connection at a base station side.

2) RRC_CONNECTED state (abbreviated as connected state): there is an RRC connection, and there is a UE context existing at both the base station side and the UE side. A network side knows a location of the UE in a specific cell level. Mobility is network-side-controlled mobility. Unicast data can be transmitted between the UE and the base station.

3) RRC_INACTIVE state (abbreviated as inactive state): mobility is UE-based cell reselection, there is a connection between CN and NR, UE context exists on a certain base station, and paging is triggered by a RAN, a RAN-based paging area is managed by the RAN, and the network side knows the location of the UE in a RAN-based paging area level.

Beam Sweeping

Figure 2:
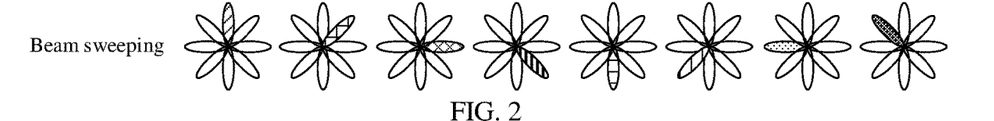
FIG. 2 is a schematic diagram of Beam sweeping according to an embodiment of the present disclosure.
Figure 3:
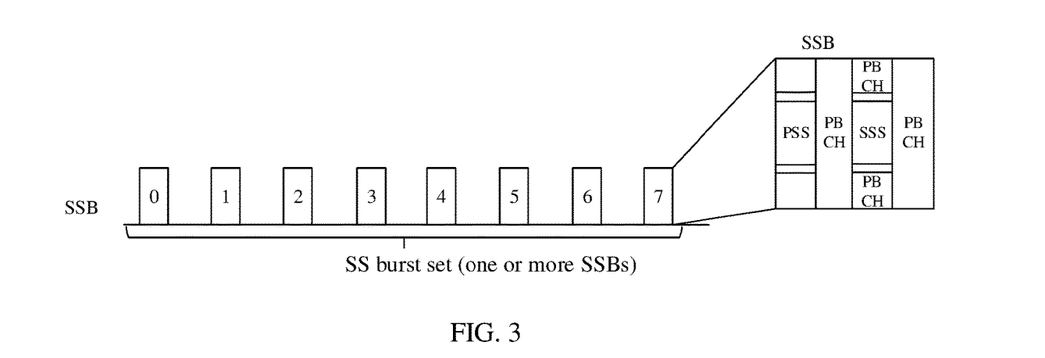
FIG. 3 is a schematic diagram of an SSB according to an embodiment of the present disclosure.
Figure 4:
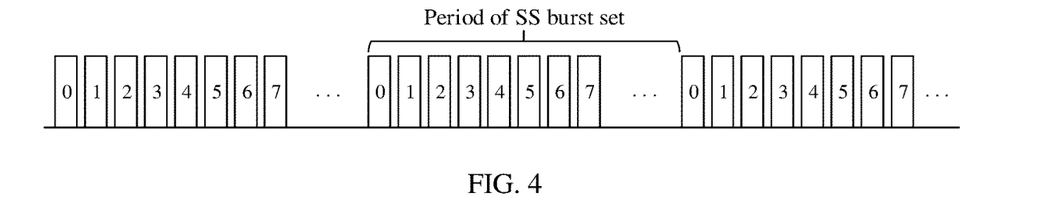
FIG. 4 is a schematic diagram of a period of an SSB burst set according to an embodiment of the present disclosure.

As illustrated in FIG. 2, NR will be deployed in high frequencies in the future, and in order to improve coverage, in 5G, the mechanism of beam sweeping is introduced to meet the coverage requirements (space for coverage, and time for space). As illustrated in FIG. 3, after the introduction of beam sweeping, a synchronization signal needs to be transmitted in each beam direction, a 5G synchronization signal is shown in the form of a synchronization signal block (SS/PBCH block, SSB), including a Primary Synchronization Signal (PSS), a Secondary Synchronization Signal (SSS), and a Physical Broadcast Channel (PBCH). As illustrated in FIG. 4, a 5G synchronization signal appears periodically in a time domain in the form of a synchronization signal burst set (SS burst set).

A quantity of beams actually transmitted in each cell is determined by a network-side configuration, but a frequency point where the cell is located determines a maximum quantity of beams that can be configured, as shown in Table 1 below.

TABLE 1

| Frequency Range | L (Maximum quantity of beams) |
|---|---|
| up to 3 (2.4) GHz | 4 |
| 3 (2.4) GHz-6 GHz | 8 |
| 6 GHz-52.6 GHz | 64 |

Bandwidth Part (BWP)

A maximum channel bandwidth in 5G may be 400 MHz (i.e., broadband), which is very large compared to a maximum channel bandwidth of 20 MHz in LTE. If a UE keeps working on a wideband carrier (i.e., the maximum channel bandwidth), the power consumption of the UE is very large. Therefore, it is suggested that a radio frequency bandwidth of the UE can be adjusted based on an actual throughput of the UE, and thus the BWP is introduced for this purpose. The motivation of introducing the BWP is to optimize the power consumption of the UE. For example, when a rate requirement of the UE is low, a smaller bandwidth (i.e., a BWP with a smaller bandwidth) can be configured for the UE. When a rate requirement of the UE is high, a larger bandwidth (i.e., a BWP with a larger bandwidth) can be configured for the UE. If the UE supports high rates, or operates in a carrier aggregation (CA) mode, multiple BWPs may be configured for the UE. In addition, another purpose of the BWP is to trigger a coexistence of multiple parameter sets (numerology) in a cell, for example, BWP1 corresponds to numerology1, and BWP2 corresponds to numerology2.

A UE in an idle state or an inactive state resides on an initial BWP, and the initial BWP is visible to the UE in the idle state or in the inactive state, and the UE can obtain a Master Information Block (MIB), a Remaining Minimum system Information (RMSI), Other System Information (OSI), paging, and other information on the initial BWP.
MBMS MBMS was introduced in 3GPP Release 6 (R6). MBMS is a technology that transmits data from a data source to multiple UEs by sharing network resources. This technology can effectively utilize the network while providing multimedia services. Broadcast and multicast of multimedia services at higher rates (such as 256 kbps) can be achieved.

It is insufficient to effectively bear and support an operation of mobile and TV services, because spectral efficiency of MBMS in 3GPP R6 is low. Therefore, in LTE, 3GPP clearly proposes to enhance the support capability for downlink high-speed MBMS services, and determines the design requirements for the physical layer and air interface.

3GPP R9 introduces evolved MBMS (eMBMS) into LTE. eMBMS proposes a concept of Single Frequency Network (SFN), which is the Multimedia Broadcast Multicast Service Single Frequency Network (MBSFN). MBSFN uses a uniform frequency to transmit service data in all cells at the same time, but need to ensure synchronization among the cells. In this way, an overall signal-to-noise ratio distribution of the cell can be greatly improved, and a spectral efficiency will also be greatly improved accordingly. eMBMS implements a broadcast and a multicast of services based on an IP multicast protocol.

In LTE or LTE-Advanced (LTE-A), MBMS has only a broadcast bearer mode but no multicast bearer mode. In addition, a reception of MBMS services is applicable to UEs in an idle state or a connected state.

A concept of Single Cell Point to Multipoint (SC-PTM) in 3GPP R13 is introduced, and the SC-PTM is based on a MBMS network architecture.

MBMS introduces new logical channels, including a Single Cell Multicast Control Channel (SC-MCCH) and a Single Cell Multicast Transport Channel (SC-MTCH). The SC-MCCH and SC-MTCH are mapped to a Downlink-Shared Channel (DL-SCH), and further, the DLSCH is mapped to a Physical Downlink Shared Channel (PDSCH), wherein the SC-MCCH and the SC-MTCH belong to logical channels, the DL-SCH belongs to a transport channel, the PDSCH belongs to a physical channel. The SC-MCCH and the SC-MTCH do not support Hybrid Automatic Repeat-reQuest (HARM) operation.

MBMS introduces a new System Information Block (SIB) type, i.e., SIB20. Specifically, configuration information of the SC-MCCH is transmitted by the SIB20, and each cell has only one SC-MCCH. The configuration information of the SC-MCCH includes: a modification period of the SC-MCCH, a repetition period of the SC-MCCH, and information such as a radio frame and a subframe scheduling the SC-MCCH. Further, 1) A boundary of the modification period of the SC-MCCH satisfies SFN modm=0, where SFN represents a system frame number of the boundary, and m is the modification period of the SC-MCCH configured in SIB20 (i.e., sc-mcch-ModificationPeriod). 2) A radio frame for scheduling the SC-MCCH satisfies: SFN mod mcch-RepetitionPeriod=mcch-Offset, where SFN represents the system frame number of the radio frame, mcch-Repetition-Period represents a repetition period of the SC-MCCH, and mcch-Offset represents an offset of the SC-MCCH. 3) A subframe scheduling the SC-MCCH is indicated by sc-mcch-Subframe.

The SC-MCCH is scheduled by a Physical Downlink Control Channel (PDCCH). On one hand, a new Radio Network Tempory Identity (RNTI), that is, a Single Cell RNTI (SC-RNTI), is introduced to identify the PDCCH (such as SC-MCCHPDCCH) that is configured to schedule the SC-MCCH. In at least one alternative embodiment, a fixed value of SC-RNTI is FFFC. On the other hand, a new RNTI, that is, a Single Cell Notification RNTI (SC-N-RNTI), is introduced to identify a PDCCH (such as a notification PDCCH) configured to indicate a change notification of the SC-MCCH. In at least one alternative embodiment, a fixed value of the SC-N-RNTI is FFFB. Further, one bit of 8 bits of the DCI 1C can be configured to indicate the change notification. In LTE, configuration information of the SC-PTM is based on the SC-MCCH configured by the SIB20, and then the SC-MCCH configures the SC-MTCH, and the SC-MTCH is used to transmit service data.

Specifically, the SC-MCCH only transmits one message (i.e., SCPTMConfiguration), and the message is used to configure the configuration information of the SC-PTM. The configuration information of the SC-PTM includes: a Temporary Mobile Group Identity (TMGI), a Session Identity (session id), a group RNTI (G-RNTI), Discontinuous Reception (DRX) configuration information and a SC-PTM service information of a neighboring cell, etc. It should be noted that the SC-PTM in R13 does not support a Robust Header Compression (ROHC) function.

A downlink discontinuous reception of the SC-PTM is controlled by the following parameters: onDurationTimerSCPTM, drx-InactivityTimerSCPTM, SC-MTCH-SchedulingCycle, and SC-MTCH-SchedulingOffset.

When meeting: [SFN*10]+subframe number] modulo (SC-MTCH-SchedulingCycle)=SC-MTCH-SchedulingOffset, a timer onDurationTimerSCPTM is started;

when receiving a downlink PDCCH scheduling, a timer drx-InactivityTimerSCPTM is started; and a downlink SC-PTM service is received only when a timer onDuration TimerSCPTM or drx-lnactivityTimerSCPTM runs.

A SC-PTM service continuity adapts a SIB15-based MBMS service continuity concept, that is, a "SIB15+ MBMSInterest1Indication" mode. A service continuity of UE in idle state is based on a concept of frequency priority.

In NR, many scenarios need to support service requirements of multicast and broadcast, such as Internet of Vehicles, Industrial Internet, etc. Therefore, it is necessary to introduce MBMS in NR. A cell reselection may occur when a terminal device receives a MBMS service. In NR, since a bandwidth support capability of the terminal device is limited, if the terminal device does not support a bandwidth of an initial BWP of a target cell, then the terminal device considers the target cell to be barred. For this purpose, it is necessary for the network side to assist the terminal device to perform cell reselection to meet the continuous reception of the MBMS service. Based on this, the following technical solutions of the embodiments of the present disclosure are proposed. MBMS services in the embodiments of the present disclosure include, but are not limited to, multicast services and multicast services.

Figure 5:
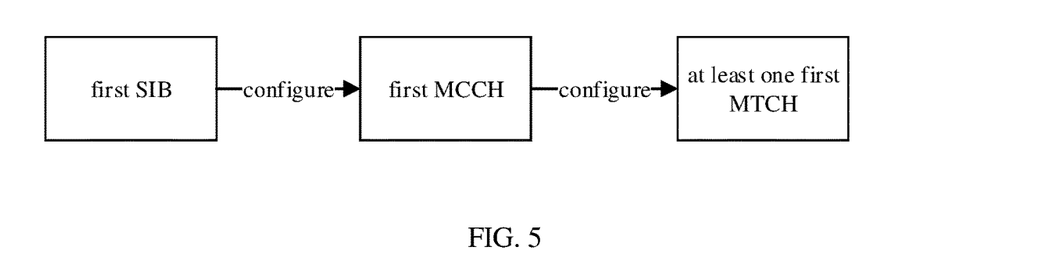
FIG. 5 is a schematic diagram of related configuration of a first SIB according to an embodiment of the present disclosure.

In an embodiment of the present disclosure, a new SIB (called a first SIB) is defined. As illustrated in FIG. 5, the first SIB includes configuration information of a first MCCH. The first MCCH is a control channel of the MBMS service, in other words, the first SIB is used to configure configuration information of the control channel of NR MBMS. In at least one alternative embodiment, the control channel of NR MBMS may also be called NR MCCH (i.e., the first MCCH).

Further, the first MCCH is used to carry a first signaling, a name of the first signaling is not limited in the embodiment of this disclosure. For example, the first signaling is signaling A. The first signaling includes configuration information of at least one first MTCH. The first MTCH is a service channel (also referred to as a data channel or a transmission channel) of the MBMS service. The first MTCH is used to transmit MBMS service data (such as NR MBMS service data). In other words, the first MCCH is used to configure configuration information of the service channel of the NR MBMS. In at least one alternative embodiment, the service channel of the NR MBMS may also be called an NR MTCH (i.e., the first MTCH).

Specifically, the first signaling is used to configure a service channel of the NR MBMS, service information corresponding to the service channel, and scheduling information corresponding to the service channel. Further, in at least one alternative embodiment, the service information corresponding to the service channel is, such as TMGI, session id and other identity information of identity services. The scheduling information corresponding to the service channel is, for example, a RNTI used when MBMS service data corresponding to the service channel is scheduled, such as G-RNTI, DRX configuration information, and the like.

It should be noted that transmissions of the first MCCH and the first MTCH are both scheduled based on a PDCCH. A RNTI used by the PDCCH to schedule the first MCCH uses a network-wide unique identification, that is, a fixed value. The RNTI used by the PDCCH to schedule the first MTCH is configured by the first MCCH.

Figure 6:
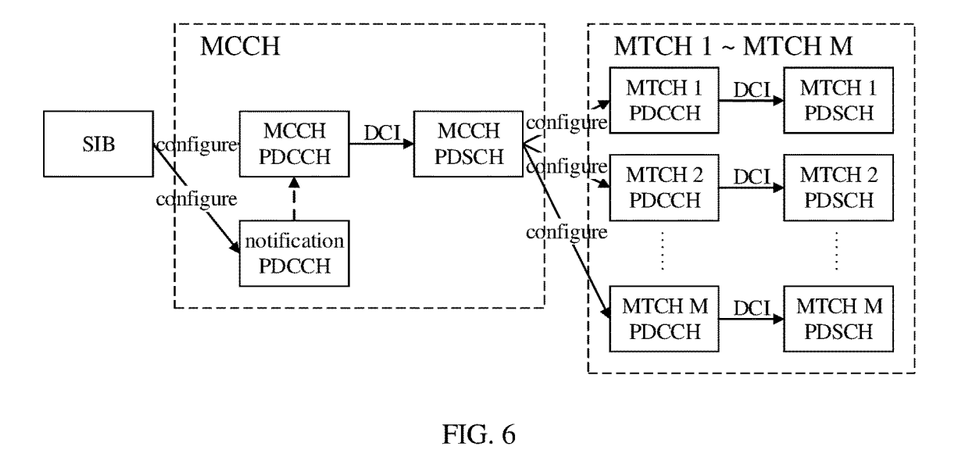
FIG. 6 is a schematic diagram of a PTM configuration transmission mechanism according to an embodiment of the present disclosure.
Figure 7:
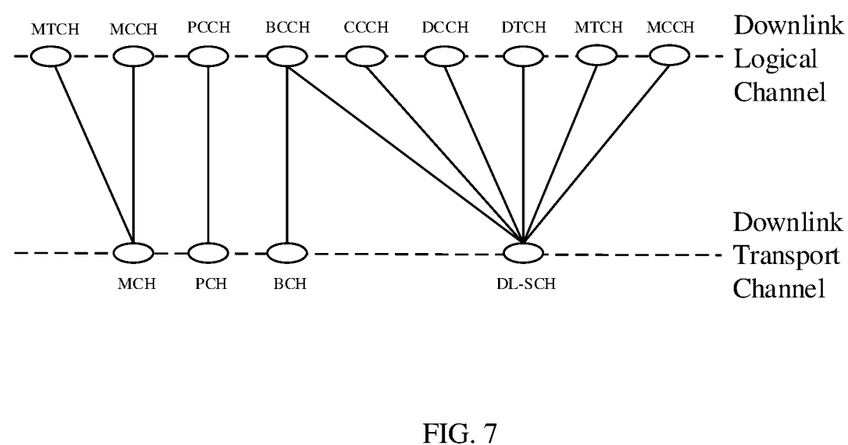
FIG. 7 is a diagram of PTM channels and a mapping thereof according to an embodiment of the present disclosure.

It should be noted the naming of the first SIB, the first MCCH, and the first MTCH is not limited in the embodiments of the present disclosure. The first SIB may also be referred to as a SIB for short for convenience, the first MCCH may also be referred to as a MCCH for short, and the first MTCH may also be referred to as a MTCH for short. Referring to FIG. 6, the PDSCH (i.e., MCCH PDSCH) used for scheduling the MCCH and the notification PDCCH are configured by SIB. The PDSCH (i.e., MCCH PDSCH) for transmitting the MCCH is scheduled by the DCI carried by the MCCH PDCCH. Further, M PDCCHs (i.e., MTCH 1 PDCCH, MTCH 2 PDCCH, . . . , MTCH M PDCCH) for scheduling the MTCHs are configured by MCCH. The PDSCH (i.e., MTCH n PDSCH) for transmitting MTCH n is scheduled by the DCI carried by MTCH n PDCCH, where n is an integer greater than or equal to 1, and smaller than or equal to M. Referring to FIG. 7, the MCCH and MTCH are mapped to a DL-SCH, and further, the DL-SCH is mapped to the PDSCH. Both MCCH and MTCH belong to logical channels, the DL-SCH belongs to transport channels, and the PDSCH belongs to physical channels.

Figure 8:
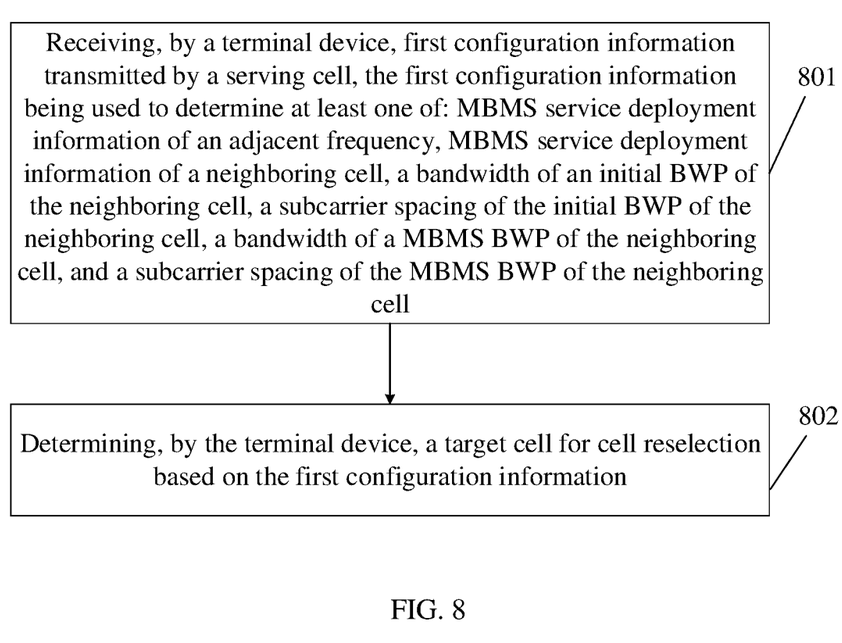
FIG. 8 is a schematic flowchart of a cell reselection method according to an embodiment of the present disclosure.

FIG. 8 is a schematic flowchart of a cell reselection method provided by an embodiment of the present disclosure, as shown in FIG. 8, the cell reselection method includes the following steps.

At step 801, a terminal device receives first configuration information transmitted by a serving cell. The first configuration information is used to determine at least one of: MBMS service deployment information of an adjacent frequency, MBMS service deployment information of a neighboring cell, a bandwidth of an initial BWP of the neighboring cell, a sub-carrier spacing of the initial BWP of the neighboring cell, a bandwidth of a MBMS BWP of the neighboring cell, and a subcarrier spacing of the MBMS BWP of the neighboring cell.

In this embodiment of the present disclosure, the serving cell transmits the first configuration information to the terminal device, and the terminal device receives the first configuration information transmitted by the serving cell. The serving cell refers to a current serving cell of the terminal device. Further, in at least one alternative embodiment, the current serving cell of the terminal device transmits the first configuration information in a broadcast manner. For example, the first configuration information is carried in a SIB or a MBMS signaling. Here, the SIB message is, for example, the first SIB in the foregoing solution, and the MBMS signaling is, for example, the first MTCH in the foregoing solution.

In an embodiment of the present disclosure, the first configuration information is used to determine at least one of: MBMS service deployment information of an adjacent frequency, MBMS service deployment information of a neighboring cell, a bandwidth of an initial BWP of the neighboring cell, a sub-carrier spacing of the initial BWP of the neighboring cell, a bandwidth of a MBMS BWP of the neighboring cell, and a sub-carrier spacing of the MBMS BWP of the neighboring cell.

Further, in at least one alternative embodiment, the first configuration information is also used to determine at least one of: MBMS service deployment information of a frequency layer where a current cell is located, MBMS service deployment information of the current cell, a bandwidth of an initial BWP of the current cell, a sub-carrier spacing of the current cell, a bandwidth of MBMS BWP of the current cell, and a sub-carrier spacing of MBMS BWP of the current cell.

It should be noted that a bandwidth of an initial BWP of a cell refers to a bandwidth indicated by locationAndBandwidth that is broadcasted in a SIB1 of the cell. A sub-carrier spacing (SCS) of an initial BWP of a cell refers to a sub-carrier spacing indicated in a MIB or a sub-carrier spacing of an initial BWP configured in a SIB1.

It should be noted that the MBMS BWP of a cell refers to a BWP configured by the cell and dedicated to transmitting MBMS services.

In at least one alternative embodiment, the MBMS service deployment information of the adjacent frequency includes MBMS service deployment information of at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell.

In at least one alternative embodiment, the MBMS service deployment information of the neighboring cell includes MBMS service deployment information of each cell in at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell. Each cell belongs to the neighboring cell of the serving cell.

In at least one alternative embodiment, the bandwidth of the initial BWP of the neighboring cell includes a bandwidth of an initial BWP of each cell in at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell. Each cell belongs to the neighboring cell of the serving cell.

In at least one alternative embodiment, the sub-carrier spacing of the initial BWP of the neighboring cell refers to a sub-carrier spacing of an initial BWP of each cell in at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell. Each cell belongs to the neighboring cell of the serving cell.

In at least one alternative embodiment, the bandwidth of the MBMS BWP of the neighboring cell refers to a bandwidth of a MBMS BWP of each cell in at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell. Each cell belongs to the neighboring cell of the serving cell.

In at least one alternative embodiment, the sub-carrier spacing of the MBMS BWP of the neighboring cell refers to a sub-carrier spacing of a MBMS BWP of each cell in at least one frequency layer. Each of the at least one frequency layer belongs to the adjacent frequency of the serving cell. Or, one of the at least one frequency layer is the frequency layer where the serving cell is located, and the other frequency layers belong to the adjacent frequency of the serving cell. Each cell belongs to the neighboring cell of the serving cell.

At step 802, the terminal device determines a target cell for cell reselection based on the first configuration information.

In an optional implementation manner, the ongoing MBMS service of the terminal device is a first MBMS service provided by the serving cell.

1) The terminal device determines a target frequency layer where the first MBMS service is deployed, based on the first configuration information. 2) When the terminal device supports at least one of the following for each cell in the target adjacent frequency layer: a bandwidth of an initial BWP, a sub-carrier spacing of the initial BWP, a bandwidth of a MBMS BWP, and a sub-carrier spacing of the MBMS BWP, the terminal device determines that the cell is in a cell reselection candidate list. Or, when the terminal device does not support at least one of the following for each cell in the target adjacent frequency layer: the bandwidth of the initial BWP, the sub-carrier spacing of the initial BWP, the bandwidth of the MBMS BWP, and the sub-carrier spacing of the MBMS BWP, the terminal device determines that the cell is not in the cell reselection candidate list. 3) The terminal device selects the target cell for cell reselection from the cell reselection candidate list.

During specific implementation, the terminal device selects the target cell for cell reselection from the cell reselection candidate list, based on a cell signal quality and/or a number of preferred beams.

For example, a terminal device resides in a current serving cell to receive MBMS service, and the terminal device simultaneously receives a SIB or MBMS signaling that is broadcasted by the current serving cell. The SIB or MBMS signaling includes the first configuration information. The terminal device considers that a priority of the frequency layer where ongoing MBMS service is present in the terminal device is the highest, and takes the frequency layer where ongoing MBMS service is present as a target frequency layer. Then, the terminal device, in the target frequency layer, determines whether to support a bandwidth of an initial BWP and/or a sub-carrier spacing of the initial BWP and/or a bandwidth of a MBMS BWP, and/or a sub-carrier spacing of the MBMS BWP of a cell (the cell belongs to the target frequency layer), based on its own bandwidth capability. If it is not supported by the terminal device, the terminal device considers that the cell, for cell reselection, is with the lowest priority, and excludes the cell from the cell reselection candidate list. If it is supported by the terminal device, and the cell has ongoing MBMS service of the terminal device, the terminal device considers that the cell is in the cell reselection candidate list. Finally, the terminal device further determines the target cell for cell reselection based on the signal quality of the cell and/or the number of high-quality beams.

In an embodiment of the present disclosure, the MBMS service deployment information in the foregoing solution includes identity information of each MBMS service in the deployed at least one MBMS service. For example, MBMS service deployment information of a cell 1 includes a list of identity information of MBMS services deployed (i.e., existing) on the cell 1. The cell 1 may refer to a serving cell or a neighboring cell Similarly, MBMS service deployment information of a frequency layer may also include a list of identity information of MBMS services deployed (i.e., existing) on the frequency layer.

Further, in at least one alternative embodiment, the identity information of the MBMS service includes at least one of: A Temporary Mobile Group Identity (TMGI), a session identity, and a MBMS service area identity (MBMS SAI).

In a technical solution of the embodiment of the present disclosure, the serving cell broadcasts the MBMS service deployment information and the information related to the BWP of the adjacent frequency and/or the neighboring cell, and the terminal device can select a cell, which is supported by its own capability and where the MBMS service is deployed, as a target cell for cell reselection, so that it is achieved that the NR system supports a continuous reception of the MBMS services, and the user experience is guaranteed.

Figure 9:
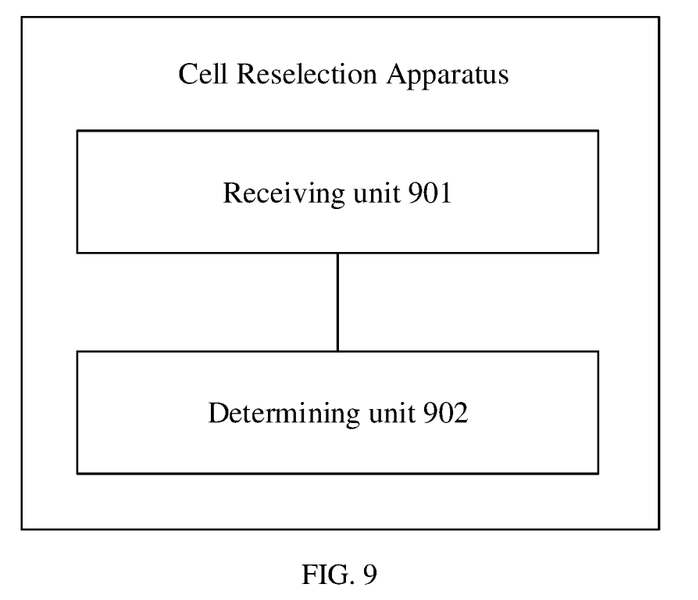
FIG. 9 is a schematic structural diagram 1 of a cell reselection apparatus according to an embodiment of the present disclosure.

FIG. 9 is a schematic structural diagram 1 of a cell reselection apparatus provided by an embodiment of the present disclosure, which is applied in a terminal device. As shown in FIG. 9, the cell reselection apparatus includes a receiving unit 901 and a determining unit 902.

The receiving unit 901 is configured to receive first configuration information transmitted by a serving cell, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell; and The determining unit 902 is configured to determine a target cell for cell reselection, based on the first configuration information.

In an alternative embodiment, the first configuration information is carried in a System Information Block (SIB) or in a MBMS signaling.

In an alternative embodiment, the MBMS service deployment information of the adjacent frequency includes: MBMS service deployment information of at least one frequency layer, wherein each of the at least one frequency layer belongs to the adjacent frequency of the serving cell.

In an alternative embodiment, the MBMS service deployment information of the neighboring cell includes: MBMS service deployment information of each cell in at least one frequency layer, wherein each of the at least one frequency layer belongs to the adjacent frequency of the serving cell, and each cell belongs to the neighboring cell of the serving cell.

In an alternative embodiment, the bandwidth of the initial BWP of the neighboring cell includes: a bandwidth of an initial BWP of each cell in at least one frequency layer, wherein each of the at least one frequency layer belongs to the adjacent frequency of the serving cell, and each cell belongs to the neighboring cell of the serving cell.

In an alternative embodiment, the sub-carrier spacing of the initial BWP of the neighboring cell is a sub-carrier spacing of an initial BWP of each cell in at least one frequency layer, wherein each of the at least one frequency layer belongs to the adjacent frequency of the serving cell, and each cell belongs to the neighboring cell of the serving cell.

In an alternative embodiment, the bandwidth of the MBMS BWP of the neighboring cell is a bandwidth of a MBMS BWP of each cell in at least one frequency layer, wherein each of the at least one frequency layer belongs to the adjacent frequency of the serving cell, and each cell belongs to the neighboring cell of the serving cell.

In an alternative embodiment, the sub-carrier spacing of the MBMS BWP of the neighboring cell is a sub-carrier spacing of a MBMS BWP of each cell in at least one frequency layer, wherein each of the at least one frequency layer belongs to the adjacent frequency of the serving cell, and each cell belongs to the neighboring cell of the serving cell.

In an alternative embodiment, an ongoing MBMS service of the terminal device is a first MBMS service provided by the serving cell.

The determining unit 902 is configured to determine, based on the first configuration information, a target frequency layer where the first MBMS service is deployed. The determining unit 902 is configured to determine that the cell is in a cell reselection candidate list when the terminal device supports at least one of the following for each cell in the target adjacent frequency layer: a bandwidth of an initial BWP, a sub-carrier spacing of the initial BWP, a bandwidth of a MBMS BWP, and a sub-carrier spacing of the MBMS BWP. And when the terminal device does not support at least one of the following for each cell in the target adjacent frequency layer: the bandwidth of the initial BWP, the sub-carrier spacing of the initial BWP, the bandwidth of the MBMS BWP, and the sub-carrier spacing of the MBMS BWP, the determining unit 902 is configured to determine that the cell is not in the cell reselection candidate list. The determining unit 902 is configured to select the target cell for cell reselection from the cell reselection candidate list.

In an alternative embodiment, the determining unit 902 is further configured to select the target cell for cell reselection from the cell reselection candidate list, based on a cell signal quality and/or a number of preferred beams.

In an alternative embodiment, the MBMS service deployment information includes identity information of each MBMS service of at least one deployed MBMS service.

In an alternative embodiment, the identity information of the MBMS service includes at least one of: A Temporary Mobile Group Identity (TMGI), a session identity, and a MBMS service area identity.

Those skilled in the art should understand that the relevant description of the foregoing cell reselection apparatus in the embodiment of the present disclosure can be understood with reference to the relevant description of the cell reselection method in the embodiment of the present disclosure.

Figure 10:
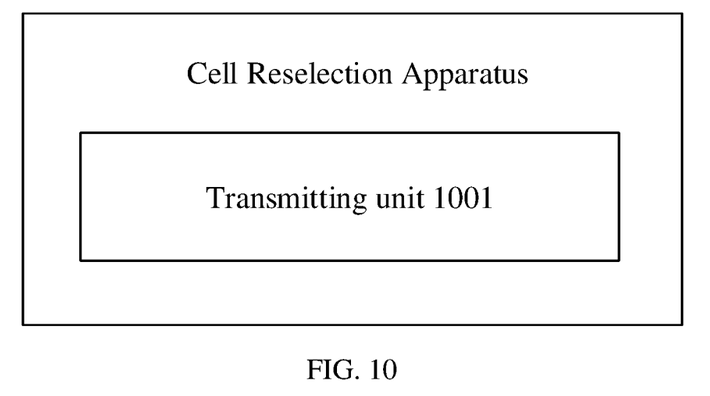
FIG. 10 is a schematic structural diagram 2 of a cell reselection apparatus according to an embodiment of the present disclosure.

FIG. 10 is a schematic structural diagram 2 of a cell reselection apparatus provided by the embodiment of the present application, which is applied in a network device. As shown in FIG. 10, the cell reselection apparatus includes a transmitting unit 1001, and the transmitting unit 1001 is configured to transmit first configuration information to a terminal device, the first configuration information being used to determine at least one of: Multimedia Broadcast Multicast Service (MBMS) service deployment information of an adjacent frequency, MBMS service deployment information of a neighboring cell, a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell.

In an alternative embodiment, the first configuration information is carried in a System Information Block (SIB) message or in a MBMS signaling.

In an alternative embodiment, the MBMS service deployment information of the adjacent frequency includes MBMS service deployment information of at least one frequency layer, and each of the at least one frequency layer belongs to the adjacent frequency of the serving cell.

In an alternative embodiment, the MBMS service deployment information of the neighboring cell includes MBMS service deployment information of each cell in at least one frequency layer, and each of the at least one frequency layer belongs to the adjacent frequency of the serving cell, and each cell belongs to the neighboring cell of the serving cell.

In an alternative embodiment, the bandwidth of the initial BWP of the neighboring cell includes a bandwidth of an initial BWP of each cell in at least one frequency layer, and each of the at least one frequency layer belongs to the adjacent frequency of the serving cell, and each cell belongs to the neighboring cell of the serving cell.

In an alternative embodiment, the sub-carrier spacing of the initial BWP of the neighboring cell is a sub-carrier spacing of an initial BWP of each cell in at least one frequency layer, wherein each of the at least one frequency layer belongs to the adjacent frequency of the serving cell, and each cell belongs to the neighboring cell of the serving cell.

In an alternative embodiment, the bandwidth of the MBMS BWP of the neighboring cell is a bandwidth of a MBMS BWP of each cell in at least one frequency layer, wherein each of the at least one frequency layer belongs to the adjacent frequency of the serving cell, and each cell belongs to the neighboring cell of the serving cell.

In an alternative embodiment, the sub-carrier spacing of the MBMS BWP of the neighboring cell is a sub-carrier spacing of a MBMS BWP of each cell in at least one frequency layer, wherein each of the at least one frequency layer belongs to the adjacent frequency of the serving cell, and each cell belongs to the neighboring cell of the serving cell.

In an alternative embodiment, the MBMS service deployment information includes identity information of each MBMS service of at least one deployed MBMS service.

In an alternative embodiment, the identity information of the MBMS service includes at least one of: a Temporary Mobile Group Identity (TMGI), a session identity, and a MBMS service area identity.

Those skilled in the art should understand that the relevant description of the foregoing cell reselection apparatus in the embodiment of the present disclosure can be understood with reference to the relevant description of the cell reselection method in the embodiment of the present disclosure.

Figure 11:
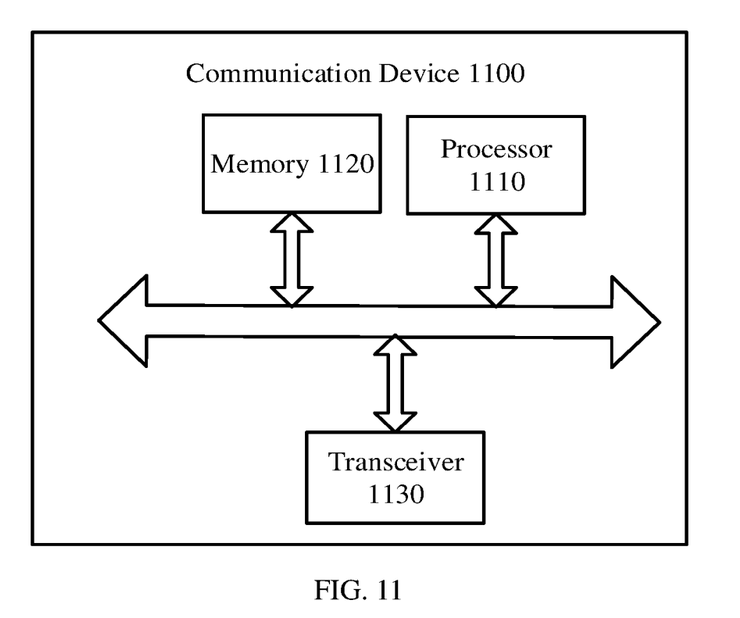
FIG. 11 is a schematic structural diagram of a communication device according to an embodiment of the present disclosure.

FIG. 11 is a schematic structural diagram of a communication device 1100 provided by an embodiment of the present disclosure. The communication device may be a terminal device or a network device. The communication device 1100 shown in FIG. 11 includes a processor 1110, and the processor 1110 is configured to invoke and execute a computer program from a memory to implement the methods in the embodiments of the present disclosure.

In at least one alternative embodiment, as shown in FIG. 11, the communication device 1100 may further include a memory 1120. The processor 1110 is configured to invoke and execute a computer program from the memory 1120 to implement the methods in the embodiments of the present disclosure.

The memory 1120 may be a separate device independent of the processor 1110, or may be integrated in the processor 1110.

In at least one alternative embodiment, as shown in FIG. 11, the communication device 1100 may include a transceiver 1130, and the processor 1110 is configured to control the transceiver 1130 to communicate with other devices, specifically, to send information or data to other devices, or to receive information or data transmitted by other devices.

The transceiver 1130 may include a transmitter and a receiver. The transceiver 1130 may further include an antenna. One or more antenna can be provided.

In at least one alternative embodiment, the communication device 1100 may specifically be the network device of the embodiment of the disclosure, and the communication device 1100 may implement the corresponding processes implemented by the network device in each method of the embodiment of the disclosure, which are not repeated here for brevity.

In at least one alternative embodiment, the communication device 1100 may specifically be the mobile terminal/terminal device of the embodiment of the present disclosure, and the communication device 1100 may implement the corresponding processes implemented by the mobile terminal/terminal device in each method of the embodiment of the present disclosure, which are not repeated here for brevity.

Figure 12:
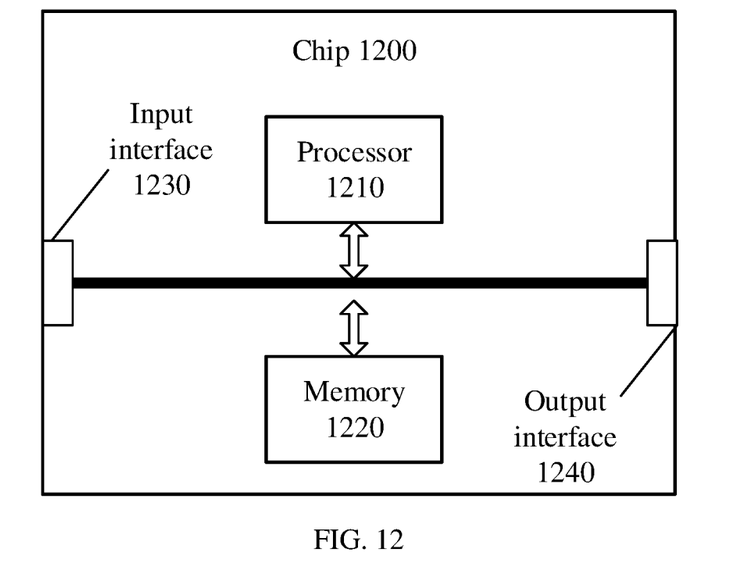
FIG. 12 is a schematic structural diagram of a chip according to an embodiment of the present disclosure.

FIG. 12 is a schematic structural diagram of a chip according to an embodiment of the present disclosure. The chip 1200 shown in FIG. 12 includes a processor 1210, and the processor 1210 is configured to invoke and execute a computer program from a memory to implement the method in the embodiment of the present disclosure.

In at least one alternative embodiment, as shown in FIG. 12, the chip 1200 may further include a memory 1220. The processor 1210 is configured to invoke and execute a computer program from the memory 1220 to implement the methods in the embodiments of the present disclosure.

The memory 1220 may be a separate device independent of the processor 1210, or may be integrated in the processor 1210.

In at least one alternative embodiment, the chip 1200 may also include an input interface 1230. The processor 1210 is configured to control the input interface 1230 to communicate with other devices or chips, and specifically, to obtain information or data transmitted by other devices or chips.

In at least one alternative embodiment, the chip 1200 may also include an output interface 1240. The processor 1210 is configured to control the output interface 1240 to communicate with other devices or chips, and specifically, to output information or data to other devices or chips.

In at least one alternative embodiment, the chip can be applied in the network device in the embodiments of the present disclosure, and the chip can implement the corresponding processes implemented by the network device in the various methods of the embodiments of the present disclosure, which are not repeated here for brevity.

In at least one alternative embodiment, this chip can be applied in the mobile terminal/terminal device in the embodiment of the present disclosure, and the chip can realize the corresponding process flow implemented by the mobile terminal/terminal device in each method of the embodiment of the present disclosure, which are not repeated here for brevity.

It should be understood that the chip mentioned in the embodiments of the present disclosure may also be referred to as a system-level-chip, a system-on-chip, a system on chip, or a system-on-chip chip, etc.

Figure 13:
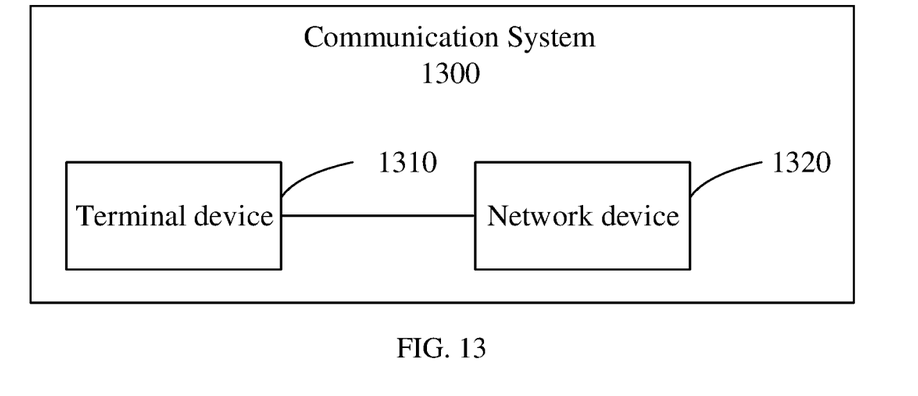
FIG. 13 is a schematic block diagram of a communication system according to an embodiment of the present disclosure.

FIG. 13 is a schematic block diagram of a communication system 1300 provided by an embodiment of the present disclosure. As shown in FIG. 13, the communication system 1300 includes a terminal device 1310 and a network device 1320.

The terminal device 1310 can be configured to realize corresponding function realized by the terminal device in the foregoing method, and the network device 1320 can be configured to realize corresponding function realized by the network device in the foregoing method, which are not repeated here for brevity.

It should be understood that the processor in the embodiment of the present disclosure may be an integrated circuit chip with a capability of signal processing. In the implementation process, each step of the foregoing method embodiment may be completed by an integrated logic circuit of hardware in a processor or an instruction in the form of software. The foregoing processor may be a general-purpose processor, a Digital Signal Processor (DSP), an Application Specific Integrated Circuit (ASIC), a Field Programmable Gate Array (FPGA) or other available programming logic devices, discrete gate or transistor logic devices, discrete hardware components. The foregoing processor can implement the methods, steps, and logic block diagrams disclosed in the embodiments of this disclosure. The general-purpose processor may be a microprocessor or any conventional processor, etc. The steps of the methods disclosed in combination with the embodiments of the present disclosure may be directly embodied as being executed by a hardware decoding processor, or being executed by a combination of hardware and software modules in the decoding processor. The software module may be located in a random access memory, a flash memory, a read-only memory, a programmable read-only memory or an electrically erasable programmable memory, registers and other mature storage media in the art. The storage medium is located in the memory, and the processor reads the information in the memory, and completes the steps of the foregoing method in combination with hardware of the processor.

It can be understood that the memory in this embodiment of the present disclosure may be a volatile memory or a non-volatile memory, or may include both volatile and non-volatile memory. The non-volatile memory may be a Read-Only Memory (ROM), a Programmable Read-Only Memory (PROM), an Erasable Programmable Read-Only Memory (EPROM), an Erasable Programmable Read-Only Memory (EPROM), Electrically EPROM (EEPROM) or a flash memory. The volatile memory may be a Random Access Memory (RAM), which acts as an external cache. By way of illustration but not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It should be noted that the memory in the systems and methods described herein is intended to include, but not be limited to, these memories and any other suitable type.

It should be understood that the foregoing memory is an exemplary but not restrictive description, for example, the memory in the embodiment of the present disclosure may also be a static RAM (SRAM), a dynamic RAM (DRAM), a synchronous DRAM (SDRAM), a double data rate SDRAM (DDRSDRAM), an enhanced SDRAM (ES-DRAM), a synch link DRAM (SLDRAM) and a Direct Rambus RAM (DRRAM) and so on. That is, the memory in the embodiments of the present disclosure is intended to include, but not limited to, these memories and any other suitable type.

The embodiments of the present disclosure also provide a computer-readable storage medium having a computer program stored thereon.

In at least one alternative embodiment, the computer-readable storage medium can be applied in the network device in the embodiment of the present disclosure, and the computer program causes the computer to execute the corresponding process flow realized by the network device in each method of the embodiment of the present disclosure, which are not repeated here for brevity.

In at least one alternative embodiment, the computer-readable storage medium can be applied in the mobile terminal/terminal device in the embodiments of the present disclosure, and the computer program causes the computer to execute the various methods of the embodiments of the present disclosure by the mobile terminal/terminal device. The corresponding process are not repeated here for brevity.

The embodiments of the present disclosure also provide a computer program product including computer program instructions.

In at least one alternative embodiment, the computer program product can be applied in the network device in the embodiments of the present disclosure, and the computer program instructions cause the computer to execute the corresponding process flow realized by the network device in each method of the embodiments of the present disclosure, which are not repeated here for brevity.

In at least one alternative embodiment, the computer program product can be applied in the mobile terminal/terminal device in the embodiments of the present disclosure, and the computer program instructions cause the computer to execute the methods implemented by the mobile terminal/terminal device in the embodiments of the present disclosure. The corresponding process is not repeated here for brevity.

The embodiments of the present disclosure also provide a computer program.

In at least one alternative embodiment, the computer program can be applied in the network device in the embodiment of the present disclosure, and the computer program, when executed by a computer, causes the computer to execute the corresponding process flow realized by the network device in each method of the embodiment of the present disclosure, which are not repeated here for brevity.

In at least one alternative embodiment, the computer program can be applied in the mobile terminal/terminal device in the embodiments of the present disclosure, and the computer program, when executed by a computer, causes the computer to execute the corresponding process flow realized by the mobile terminal/terminal device in each method of the embodiment of the present disclosure The corresponding process implemented by the terminal device are not repeated here for brevity.

Those of skilled in the art can realize that the units and algorithm steps of each example described in combination with the embodiments disclosed herein can be implemented by electronic hardware, or a combination of computer software and electronic hardware. Whether these functions are performed in hardware or software depends on specific applications and design constraints of the technical solution. Those skilled professionals may implement the described functionality with different methods for each particular application, but such implementations should not be considered beyond the scope of this disclosure.

Those skilled in the art can clearly understand that, for convenience and succinctness of description, the specific working process of the above-described system, device and unit can be referred to the corresponding process in the foregoing method embodiment, and be not repeated here.

In the several embodiments provided in this disclosure, it should be understood that the disclosed systems, apparatuses and methods may be implemented in other ways. For example, the apparatus embodiments described above are only illustrative. For example, the division of the units is only a logical function division, and there may be other division methods in actual implementation. For example, multiple units or components may be combined or integrated into another system, or some features can be omitted, or not implemented. In addition, the shown or discussed mutual coupling or direct coupling or communication connection may be via some interfaces. The indirect coupling or communication connection of devices or units, may be in electrical, mechanical or other forms.

Units described as separate components may or may not be physically separated, and the component displayed as a unit may or may not be a physical unit, that is, it may be located in one place, or may be distributed on multiple networks units. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit.

If the functions are implemented in the form of software functional units and sold or used as independent products, they may be stored in a computer-readable storage medium. Based on this, the technical solution of the present disclosure or the part that contributes to the related art or a part of the technical solution can be embodied in the form of a software product in essence. The computer software product is stored in a storage medium, including several instructions configured to make a computer device (which may be a personal computer, a server, or a network device, etc.) to execute all or some of the steps of the methods described in the various embodiments of the present disclosure. The foregoing storage medium includes: a U disk, a mobile hard disk, a Read-Only Memory (ROM), a Random Access Memory (RAM), a magnetic disk or an optical disk and other media that can store program codes.

The foregoing described embodiments are only specific embodiments of the disclosure, but the protection scope of the disclosure is not limited thereto. Changes or substitutions that can be thought of by any person skilled in the art in the technical scope disclosed by the disclosure should be within the protection scope of this disclosure. Therefore, the protection scope of the present disclosure should be based on the protection scope of the claims.

What is claimed is:

1. A cell reselection method, comprising:
receiving, by a terminal device, first configuration information transmitted by a serving cell, the first configuration information being used to determine Multimedia Broadcast Multicast Service (MBMS) service deployment information of a neighboring cell; wherein the MBMS service deployment information of the neighboring cell comprises: MBMS service deployment information of each cell in at least one frequency layer, wherein the at least one frequency layer belongs to the adjacent frequency of the serving cell, and each cell in the at least one frequency layer belongs to the neighboring cell of the serving cell; and
determining, by the terminal device, a target cell for cell reselection based on the first configuration information.

2. The method according to claim 1, wherein the first configuration information is carried in a System Information Block (SIB) or in a MBMS signaling.

3. The method according to claim 1, wherein the first configuration information is further used to determine at least one of:
a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell.

4. The method according to claim 3, wherein the bandwidth of the initial BWP of the neighboring cell comprises:
a bandwidth of an initial BWP of each cell in at least one frequency layer, wherein the at least one frequency layer belongs to the adjacent frequency of the serving cell, and each cell in the at least one frequency layer belongs to the neighboring cell of the serving cell.

5. The method according to claim 3, wherein the sub-carrier spacing of the initial BWP of the neighboring cell is
a sub-carrier spacing of an initial BWP of each cell in at least one frequency layer, wherein the at least one frequency layer belongs to the adjacent frequency of the serving cell, and each cell in the at least one frequency layer belongs to the neighboring cell of the serving cell.

6. The method according to claim 3, wherein the bandwidth of the MBMS BWP of the neighboring cell is
a bandwidth of a MBMS BWP of each cell in at least one frequency layer, wherein the at least one frequency layer belongs to the adjacent frequency of the serving cell, and each cell in the at least one frequency layer belongs to the neighboring cell of the serving cell.

7. The method according to claim 3, wherein the sub-carrier spacing of the MBMS BWP of the neighboring cell is
a sub-carrier spacing of a MBMS BWP of each cell in at least one frequency layer, wherein the at least one frequency layer belongs to the adjacent frequency of the serving cell, and each cell in the at least one frequency layer belongs to the neighboring cell of the serving cell.

8. The method according to claim 1, wherein an ongoing MBMS service of the terminal device is a first MBMS service provided by the serving cell; and
said determining, by the terminal device, the target cell for cell reselection based on the first configuration information comprises:
determining, by the terminal device based on the first configuration information, a target frequency layer where the first MBMS service is deployed;
when the terminal device supports at least one of the following for each cell in the target frequency layer: a bandwidth of an initial BWP, a sub-carrier spacing of the initial BWP, a bandwidth of a MBMS BWP, and a sub-carrier spacing of the MBMS BWP, determining, by the terminal device, that the cell is in a cell reselection candidate list; when the terminal device does not supports at least one of the following for each cell in the target frequency layer: the bandwidth of the initial BWP, the sub-carrier spacing of the initial BWP, the bandwidth of the MBMS BWP, and the sub-carrier spacing of the MBMS BWP, determining, by the terminal device, that the cell is not in the cell reselection candidate list; and
selecting, by the terminal device, the target cell for cell reselection from the cell reselection candidate list.

9. The method according to claim 8, wherein said selecting, by the terminal device, the target cell for cell reselection from the cell reselection candidate list comprises:
selecting, by the terminal device, the target cell for cell reselection from the cell reselection candidate list, based on a cell signal quality and/or a number of preferred beams.

10. The method according to claim 1, wherein the MBMS service deployment information comprises: identity information of each MBMS service of at least one deployed MBMS service.

11. The method according to claim 10, wherein the identity information of the MBMS service comprises at least one of: a Temporary Mobile Group Identity (TMGI), a session identity, and a MBMS service area identity.

12. A cell reselection method, comprising:
transmitting, by a serving cell, first configuration information to a terminal device, the first configuration information being used to determine Multimedia Broadcast Multicast Service (MBMS) service deployment information of a neighboring cell; wherein the MBMS service deployment information of the neighboring cell comprises: MBMS service deployment information of each cell in at least one frequency layer, wherein the at least one frequency layer belongs to the adjacent frequency of the serving cell, and each cell in the at least one frequency layer belongs to the neighboring cell of the serving cell.

13. The method according to claim 12, wherein the first configuration information is carried in a System Information Block (SIB) or in a MBMS signaling.

14. The method according to claim 12, wherein the first configuration information is further used to determine at least one of:
a bandwidth of an initial Bandwidth Part (BWP) of the neighboring cell, a sub-carrier spacing of the initial BWP of the neighboring cell, a bandwidth of a MBMS BWP of the neighboring cell, and a sub-carrier spacing of the MBMS BWP of the neighboring cell.

15. The method according to claim 14, wherein the bandwidth of the initial BWP of the neighboring cell comprises:
a bandwidth of an initial BWP of each cell in at least one frequency layer, wherein the at least one frequency layer belongs to the adjacent frequency of the serving cell, and each cell in the at least one frequency layer belongs to the neighboring cell of the serving cell.

16. The method according to claim 14, wherein the sub-carrier spacing of the initial BWP of the neighboring cell is
a sub-carrier spacing of an initial BWP of each cell in at least one frequency layer, wherein the at least one frequency layer belongs to the adjacent frequency of the serving cell, and each cell in the at least one frequency layer belongs to the neighboring cell of the serving cell.

17. A terminal device, comprising:
a processor; and
a memory having a computer program stored thereon, the processor being configured to invoke and execute the computer program stored in the memory to implement a cell reselection method, the cell reselection method comprising:
receiving first configuration information transmitted by a serving cell, the first configuration information being used to determine Multimedia Broadcast Multicast Service (MBMS) service deployment information of a neighboring cell; wherein the MBMS service deployment information of the neighboring cell comprises: MBMS service deployment information of each cell in at least one frequency layer, wherein the at least one frequency layer belongs to the adjacent frequency of the serving cell, and each cell in the at least one frequency layer belongs to the neighboring cell of the serving cell; and
determining a target cell for cell reselection based on the first configuration information.

18. A network device, comprising:
a processor; and
a memory having a computer program stored thereon, the processor being configured to invoke and execute the computer program stored in the memory to implement the method according to claim 12.

* * * * *